Nov. 24, 1942.   A. E. KROGH   2,303,081
CONTROL APPARATUS
Filed May 22, 1940   4 Sheets-Sheet 1

INVENTOR.
ANKER E. KROGH
BY C. B. Spangenberg
ATTORNEY

Nov. 24, 1942.　　　　A. E. KROGH　　　　2,303,081
CONTROL APPARATUS
Filed May 22, 1940　　　　4 Sheets-Sheet 2

INVENTOR.
ANKER E. KROGH
BY　E.B. Spangenberg
ATTORNEY

Patented Nov. 24, 1942

2,303,081

UNITED STATES PATENT OFFICE 2,303,081

CONTROL APPARATUS

Anker E. Krogh, Mount Airy, Pa., assignor to The Brown Instrument Company, Philadelphia, Pa., a corporation of Pennsylvania Application May 22, 1940, Serial No. 336,519

14 Claims. (Cl. 236—15)

The present invention relates to electrical control apparatus of the proportioning system type in which a normally balanced electrical network or bridge is unbalanced by a controlling condition change, and by its unbalance sets a control motor into operation to effect a corrective control action and to subject said network or bridge to a rebalancing adjustment proportional to the control action.

The general object of the present invention is to provide an improved control apparatus of the type mentioned including provisions for separately adjusting the network or bridge impedance in response to variations in each of two or more related control conditions, and thereby correspondingly actuating the control and rebalancing motor, and including other motor means for producing a further bridge unbalancing, or compensating effect, dependent on the departure of one, or more than one, controlling condition from its normal value, and resulting in a further control action of the control motor.

A more specific object of the invention is to provide a simple and effective control system of the kind specified with means for effecting compensating adjustments suitable for the particular conditions of use, without interfering with the capacity of the system to properly perform its primary functions.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a diagrammatic view of one embodiment of the invention;

Fig. 6 represents one modification, and Fig. 7 represents a second modification of a portion of the control apparatus shown in Fig. 1.

Figures 1, 6, 7:
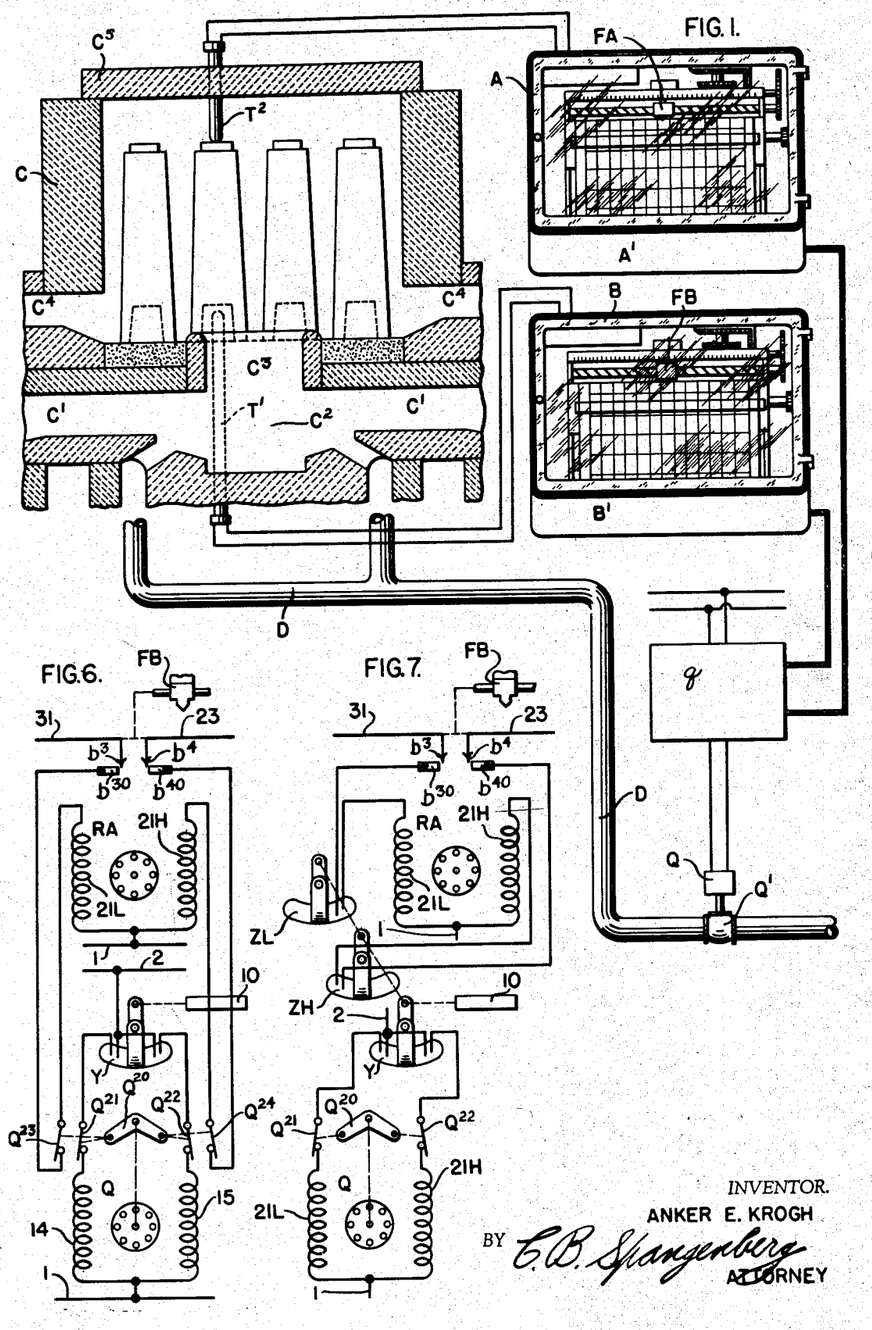
Figures 2, 3:
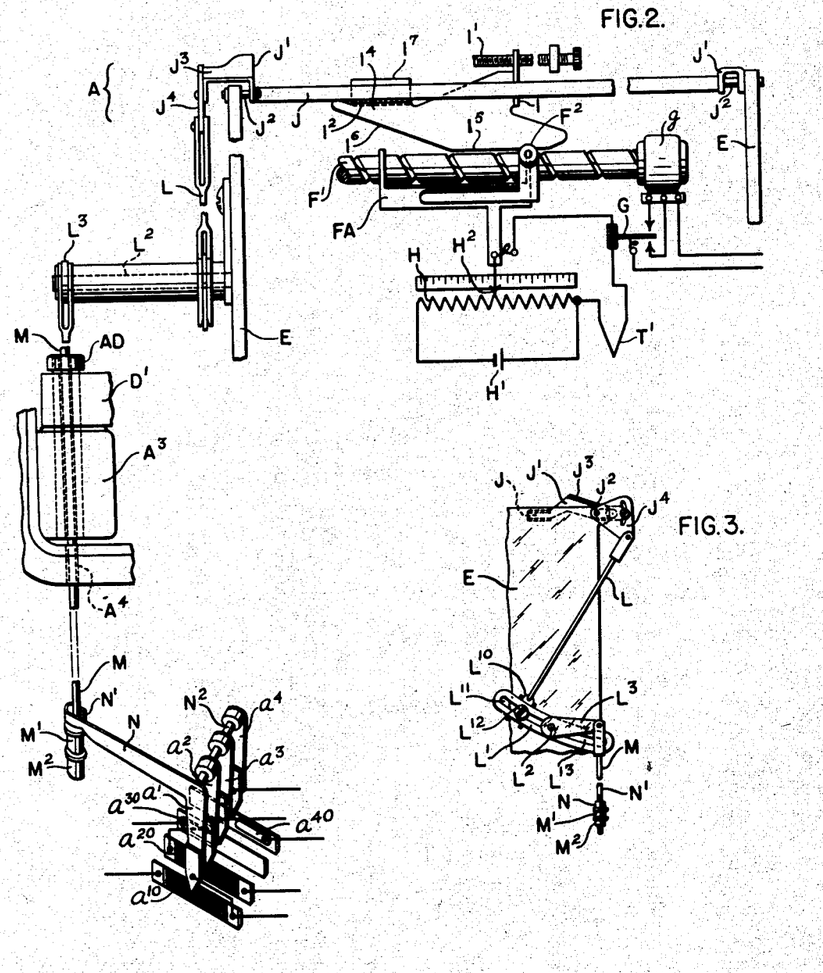
Fig. 2 is a fragmentary diagrammatic view of a portion of a control instrument shown in Fig. 1.
Fig. 3 is an elevation taken at right angles to Fig. 2, of a portion of the mechanism shown in Fig. 2.

In the embodiment of the invention illustrated in Figs. 1, 2 and 3, A and B comprise control instruments for measuring different work temperatures in a furnace C. The latter, as shown, is an ingot heating soaking pit furnace C, and the instruments A and B directly measure the temperatures of thermocouples $T'$ and $T^2$ respectively responsive to the temperatures at the butt and top ends of an ingot in the soaking pit. The furnace, as conventionally illustrated comprises air inlets $C'$ to a mixing chamber $C^2$ at opposite sides of the latter. Fuel gas is supplied to the chamber $C^2$ at opposite sides of the latter. Fuel gas is supplied to the chamber $C^2$ by a pipe D including a control valve $Q'$, adjusted by a motor Q under the control of instruments A and B, and control mechanism collectively designated $q$ in Fig. 1, and shown diagrammatically in Fig. 4. The mixing chamber opens to the pit chamber through a port $C^3$ centrally located in the floor or hearth of the pit chamber. The latter ejects waste gas at opposite outlets $C^4$. In the conventional type of furnace shown, the air inlet $C'$ and the waste gas outlet $C^4$ at each side of the furnace are connected to a corresponding recuperator (not shown). As diagrammatically indicated, the roof $C^5$ of the furnace is removable for the insertion and removal of ingots, and serves as a support for the thermocouple $T^2$.

The instruments A and B shown are recording potentiometer control instruments and may be identical in construction and of known type. The portion of the instrument A of interest herein is shown somewhat diagrammatically in Fig. 2, as comprising a recorder carriage FA, movable horizontally in one direction or the other, by the rotation of a helically grooved or screw thread shaft $F'$ in threaded engagement with the carriage FA. As diagrammatically shown, the shaft $F'$ is rotated by a reversible motor $g$ controlled by the pointer of a galvanometer G, which has one terminal connected to a contact $H^2$ moved by the carriage FA along a potentiometer slide wire resistance H. The latter is energized by a voltage course $H'$, and the thermocouple $T'$ is connected between the second terminal of the galvanometer G and one end of the potentiometer resistance H. The potentiometer instrument mechanism shown is of the particular form disclosed in my Patent 2,159,971, granted May 30, 1939.

The control provisions of the instrument A shown in Fig. 2, comprises a so-called control table I cooperating with the recorder carriage FA. The control table I normally occupies a fixed position along the path of movement of the recorder carriage FA, but may be adjusted along that path by rotating a shaft I' parallel to the shaft F' and in threaded engagement with the table I. A control member $I^2$ is pivotally connected to the table I to turn about an axis parallel to the shafts F' and I'. The part $I^2$ carries a lateral extension $I^4$, which, preferably, is detachably connected to the part $I^2$ and is formed with an engaging edge which normally rests on roller part $F^2$ carried by the carriage FA and comprises a horizontal portion $I^5$ and an inclined portion $I^6$.

As the recorder carriage FA moves to the left, as seen in the drawings, no movement is given to the control table part $I^2$ so long as the horizontal edge portion $I^5$ is in engagement with the roller $F^2$, but as the roller $F^2$ moves away from the left hand end of the edge portion $I^5$, the control table part $I^2$ turns down under the action of gravity or other suitable bias force, to the extent permitted by the engagement of the inclined edge portion $I^6$, with the roller $F^2$. The normal control range of the instrument, in which its control effect varies with the position of the carriage F, is that required for movement of the roller $F^2$ into and out of engagement with the edge portion $I^6$. When its movement to the left carries the roller $F^2$ out of engagement with the edge portion $I^6$, further down movement of the control table part $I^2$ is prevented by means hereinafter described.

On a movement of the pen carriage to the right of the position in which it engages edge $I^5$, part $I^4$ will be retained in its adjusted position by means described in my above-mentioned patent, and need not be described here.

The up and down movement of the control table part $I^2$ gives corresponding movement to a control bar J having its underside bearing against the control table part $I^2$ and prevented from separating from the latter by a guide part $I^7$. The control bar J extends between the two stationary end plates E and is connected at its ends to the arms J', each pivotally connected to the adjacent edge plate E by a pivot $J^2$ coaxial with the pivot for the control table part $I^2$. The left arm J' is provided with a transverse portion $J^3$ adapted to engage the upper edge of the adjacent end plate E, and thus arrest the down movement of the control bar J and control table part $I^2$ gives corresponding movement to the left, of the edge portion $I^6$.

The up and down movements of the table actuate associated control apparatus located in a lower compartment A' of the instrument casing, through a link L having its upper end pivotally connected to an extension $J^4$ connected to transverse member $J^3$, and having its lower end pivotally connected to the arm L' of a rocking element. The latter comprises a hub portion surrounding a shaft $L^2$ carried by the adjacent member E. The rocking element also comprises a second arm $L^3$, to which the upper end of a vertically disposed link M is pivotally connected. The link M is in the form of a round bar or shaft and extends downward through an opening $A^4$ in the bottom wall of the casing compartment in which the potentiometer recording mechanism is normally housed. The lower end of the link M carries an actuating abutment formed by a nut M', which is adjustably secured in place on the link by a lock nut $M^2$.

Figure 4:
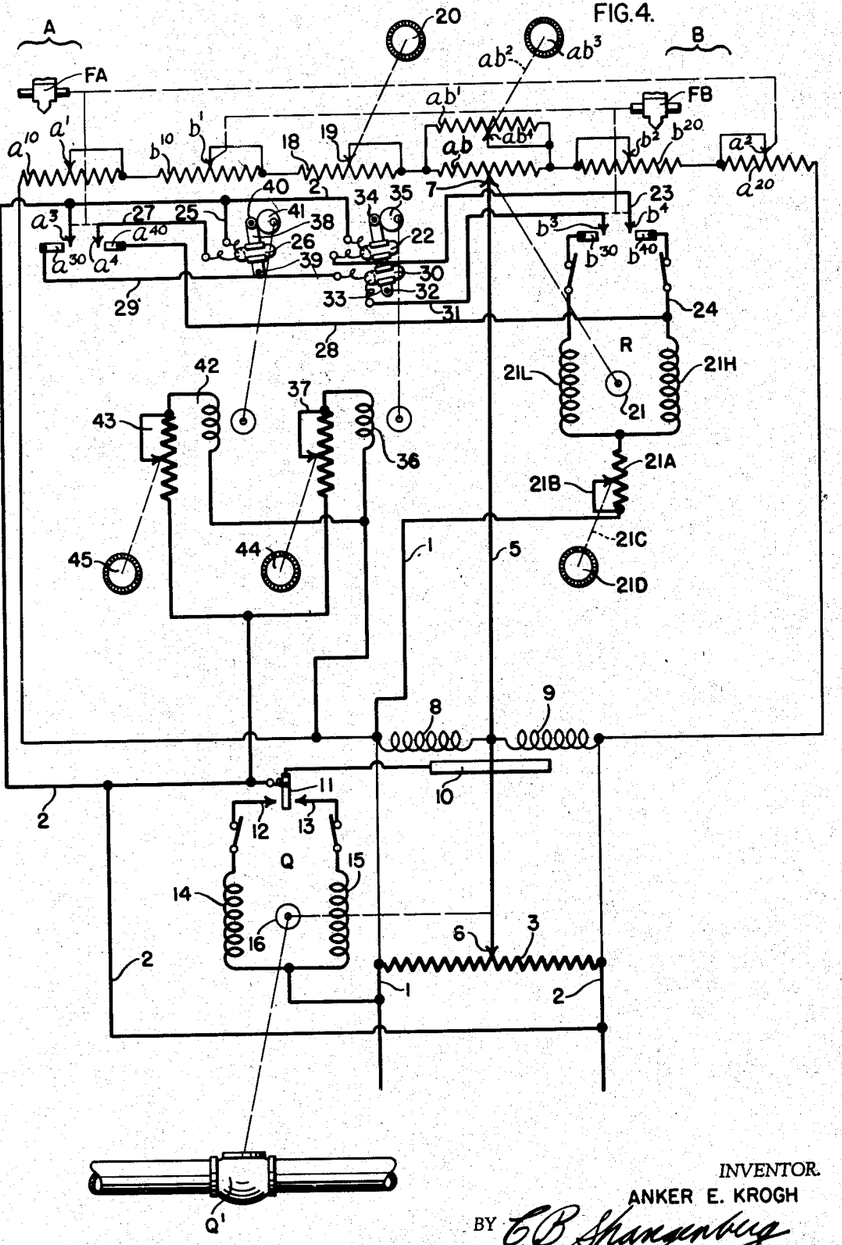
Fig. 4 is a diagrammatic view of the electrical control provisions of the embodiment shown in Fig. 1.

The vertical movements of the abutment M' give movements to the actuating element N of the control apparatus located in the compartment A'. As shown, the actuating element N is a horizontally disposed lever or rock shaft arm formed with a slot N' at its free end through which the link M passes. The lever arm N has a gravitational bias for movement in the counter-clockwise direction, as seen in Fig. 2, so that its slotted end is supported by the abutment nut M' and follows the up and down movements of the latter. The arm N of the instrument A is secured to a rock shaft $N^2$ and when turned gives angular adjustments to a series of depending contact arms a', $a^2$, $a^3$ and $a^4$ carried by the rock shaft $N^2$ and shown in Figs. 2 and 4. The corresponding contact arms located in the casing compartment of the instrument B, are shown diagrammatically in Fig. 4 and are there designated b', $b^2$, $b^3$ and $b^4$. In Fig. 4, the pen carriage of the instrument B is designated FB and is shown diagrammatically as having a straight line movement and the carriage FA of the instrument A is similarly shown in Fig. 4. In that figure, the dotted line connection between the carriage FA and the contact arms a', $a^2$, $a^3$ ad $a^4$, represent the linkage, such as that formed by the elements J, L, M and N of Fig. 2, which may be employed to connect the carriage FA and contact arms, and the dotted line connection between the table FB and contact arms b', $b^2$, $b^3$ and $b^4$, diagrammatically represents the similar linkage of the instrument FB.

This linkage of each instrument should preferably include throttling range adjusting provisions by means of which the extent of the control effect produced by a given movement of carriage FA or FB is individually predetermined, because normally the effect resulting from a movement of carriage FA will desirably be different from that resulting from an equal movement of carriage FB. To this end, and as will be clear from Fig. 3, the point of attachment of the link L to lever L' is made adjustable toward and away from the axis of shaft $L^2$, the extent of up or down movement of link M in response to a given movement of link L depending upon that adjustment. As shown, the link L is attached to a part $L^{10}$ adjustable in slot $L^{11}$ of lever L' and clamped in the desired position by screw $L^{12}$. Another slot $L^{13}$ is provided in the lever L' on the opposite side of the axis of shaft $L^2$ from slot $L^{11}$ to alternatively accommodate part $L^{10}$, whereby the direction of the control effect produced by movement of link L may be reversed.

The apparatus of Fig. 3 ultimately controls the fuel valve Q' such control being effected in part by the cooperation of contacts a', $a^2$ of the instrument A and contacts b', $b^2$ of the instrument B, with resistor portions of the same electrical network or bridge circuit, whereby continuous responsiveness to each of the significant conditions is attained. Contacts a', $a^2$ respectively engage and are adjustable along resistors $a^{10}$ and $a^{20}$, and contacts b' and $b^2$ respectively engage and are adjustable along resistors $b^{10}$ and $b^{20}$. The resistors $a^{10}$ and $b^{10}$ are at one side, and the resistors $b^{20}$ and $a^{20}$ are at the other side of a midresistor ab, and all of said resistors are connected in series between the bridge energizing line conductors 1 and 2, connected to a suitable source of energizing current. Another resistor 3 forms a second branch of the bridge circuit connected in parallel with the branch including the resistors $a^{10}$, $b^{10}$, ab, $b^{20}$ and $a^{20}$ circuit, and an equalizing conductor 5 extends between a contact 6 engaging and adjustable along resistor 3, and a contact 7 engaging and adjustable along resistor ab.

The bridge circuit is adapted to be unbalanced by adjustment of resistors $a^{10}$, $a^{20}$, $b^{10}$, $b^{20}$ or 3, thereby cause a difference in potential between contacts 6 and 7. Such a potential difference causes an unequal division of current flow in opposed solenoid coils 8 and 9 connected in series between the energizing conductors 1 or 2, and having their adjacent ends connected to conductor 5. The coils 8 and 9 are inductively related to an armature 10, which is moved, on unbalance in the current flows through the coils, toward coil 8 or toward coil 9, depending upon the direction of unbalance, and thereby controls a contact member 11. Contact member 11 is connected to line conductor 2, and is arranged to engage one or the other of a pair of contacts 12, 13 when armature 10 is deflected in one direction or the other from a normal mid position. Contact 12 is connected to one terminal of the field winding 14, of a reversible motor Q and the contact 13 is connected to one terminal of the second field winding 15 of the motor, the opposite terminals of the field windings connected together to line conductor 1. Motor Q actuates the valve Q' through suitable gearing, and is also operatively connected to contact 6 along resistor 3, to adjust the latter in the direction to restore the bridge balance when the motor is set into operation by bridge unbalance.

If the apparatus did not extend beyond that already described, it would effect control of fuel valve Q' jointly from instruments A and B. A movement of the contacts $a'$ and $a^2$ to the left, for example, in response to a decrease in the ingot bottom temperature below its predetermined normal value, will unbalance the bridge circuit with the result of increasing the current flow in the relay coil 9 relative to that in the coil 8, whereupon the contact 11 will be moved into engagement with the contact 13. This will start the motor Q into operation in the direction to open the fuel valve Q' and thereby increase the ingot temperatures. The operation of the motor Q will adjust the contact 6 to the right and if no further control condition change occurs in the meantime, the valve opening movements of the motor Q will be continued until the movement of the contact 6 rebalances the bridge and equalizes the current flow through the coils 8 and 9, whereupon the contact 11 will be moved to its midposition in which it engages neither of the contacts 12 and 13. If the drop in ingot bottom temperature is accompanied by a simultaneous ingot top temperature decrease, it will effect a further fuel correction in the same direction, but if the ingot top temperature increases simultaneously with, and in suitable proportion to the decrease in ingot butt temperature, the effects of the two temperature changes will cancel out and no fuel correction will be made.

The total resistance in the bridge arms including resistors $a^{10}$, $b^{10}$, $A^{20}$ and $b^{20}$, will remain constant notwithstanding adjustment of the resistors as described. This feature is made possible by the arrangement of the contacts and their connection each to one end of the corresponding resistor, so that when more or less of the resistors $a^{10}$ or $b^{10}$, is short circuited, an equal but reverse change in the short circuited portion of the resistor $a^{20}$ or $b^{20}$ is made. Thus on an adjustment of contacts $a'$ and $a^2$, or of contacts $b'$ and $b^2$, the resistance removed from the arm at one side of the contact 7 will be equal to the resistance added to the arm on the opposite side of the contact, whereby equal movements of the contacts in different portions of their range of movement will produce substantially equal valve movements.

A resistor 18 shown in the bridge arm to the left of contact 7, is employed to limit the travel of the valve Q', and is adjustable by means of a short circuiting connection including a contact 19 which may be adjusted by a manually adjustable knob 20 connected in a suitable manner to the contact 19. The resistance 18 does not significantly upset the symmetry of the circuit just referred to, but any such upsetting effect may be eliminated by placing a similar resistance and adjustable contact on the opposite side of contact 7 and arranged for operation simultaneously with contact 19.

In a stable control system such as the one just described, and without the load compensating features now to be disclosed, a furnace load change requiring more fuel will tend to make the system maintain a temperature lower than the desired temperature, while a furnace load change requiring less fuel will tend to make the system maintain a temperature higher than the desired value. Electrical load compensating control apparatus is not in itself new, out I have incorporated in Fig. 4 a novel arrangement of such apparatus making practicable the maintenance of more precise temperature control without interference with the other requirements of the control system, than is the case with other control systems including load compensating means, now known. For example, it is desirable, in the control application or use illustrated in Figs. 1–4, to effect a load compensating adjustment in a direction to reduce the fuel supply if either the ingot butt temperature or the ingot top temperature is too high, but it is not desirable to effect a load compensating adjustment in a direction to increase the fuel supply unless both of those temperatures are low.

For purposes of compensating the system for load variations I have shown in Fig. 4, electrical load compensating or reset provisions including a reversible motor R coupled to the contact 7 to adjust the latter, which in the description of the apparatus up to this point, has been considered stationary. Motor R is provided with two fields 21L and 21H respectively adapted to rotate the motor armature 21 in a direction to move contact 7 to the left and to the right, thereby increasing or decreasing the fuel supply. The motor R is energized through circuits including contacts $a^3$, $a^4$, $b^3$ and $b^4$. The contacts $a^3$ and $a^4$ are deflected by table FA, as are the contacts $a'$ and $a^2$, in accordance with the variations in ingot top temperature, and cooperate with stationary contacts $a^{30}$, $a^{40}$. Similarly contacts $b^3$ and $b^4$ are deflected by carriage FB, as are the contacts $b'$ and $b^2$, in accordance with changes in the ingot butt temperature, and cooperate with stationary contacts $b^{30}$, $b^{40}$. When contacts $a^3$, $a^4$ and $b^3$, $b^4$ are undeflected, as they will be when both temperatures are normal, no circuits including those contacts will be closed.

When contact $b^4$ is deflected to the right on a rise in ingot butt temperature, a circuit will be closed to field 21H from line 2 to switch 22, through the latter, when closed, to conductor 23, contacts $b^4$ and $b^{40}$, conductor 24, field 21H to line 1. When contact $a^4$ is deflected to the right on a rise in ingot top temperature, a circuit will be closed for field 21H from line 2, conductor 25, switch 26, conductor 27, contacts $a^3$ and $a^{40}$ and conductor 28, field 21H to the line conductor 1. Thus contact 7 is moved to the right in response to a rise in either the ingot butt temperature, or the ingot top temperature, to thereby effect a closing adjustment of valve Q'.

On a deflection of contacts $a^3$ and $b^3$ to the left, a circuit is closed from the line conductor 2, contacts $a^3$ and $a^{30}$, conductor 29, switch 30, conductor 31, contacts $b^3$ and $b^{30}$, field 21L to line 1, but this circuit can be effected only upon deflection of both contacts $a^3$ and $b^3$ to the left, and contacts $a^3$ and $b^3$ are both deflected to the left only when the ingot top and butt temperatures are both low.

The switches 22, 26 and 30 respectively controlling the circuits above traced, are automatic interrupter switches, which might be made unnecessary in any particular installation by suitably proportioning the motor 21 and its gear connection to the contact 7, but those switches serve purposes of adjustment adapting the apparatus to different specific practical requirements, and being closed during relatively fixed but manually adjustable time periods. Switches 22 and 30 are mounted on bracket 32 pivoted at 33, and the bracket 32 is provided with a roller 34 in engagement with cam 35. Cam 35 is driven by a unidirectional motor 36 energized from the line wires 1 and 2, and provided with speed adjustment means including a contact 37. Switch 26 is mounted on a bracket 38 pivoted at 39, a roller 40 of the bracket being adapted to be engaged by cam 41 driven by a second unidirectional motor 42 also energized from line wires 1 and 2. The speed of motor 42 is controlled by an adjustable resistor and contact 43, and the speed adjustment devices 37 and 43 are controlled respectively by manual adjusting dials 44 and 45, the angular adjustment of said dials determining the time period of closure of switches 22 and 30 and 26 respectively. Said switches and their operating means thus form, in effect, means by which the load compensation or reset effect, produced by adjustment of the contact 7 and injected into the collective control action, is proportioned to the duration of departure of the ingot top and ingot butt temperatures from their respective normal values. If it is desired to make the extent of movement of the contact 7 dependent not only upon the direction of deflection of moving contacts $a^3$ and $a^4$, $b^3$ and $b^4$ but upon the extent of deflection, the stationary contacts $a^{30}$, $a^{40}$, $b^{30}$ and $b^{40}$ may be formed of material of a relatively high electrical resistance, whereby the speed of rotation of the motor 21 will depend not only upon the existing adjustment of devices 37 and 43, but upon the extent of deflection of the movable contacts.

For purposes of manual adjustment of the extent of ultimate control effect resulting from a given adjustment of the various resistors, a resistor $ab'$ is shunted about resistor $ab$, and means including a manually adjustable knob $ab^3$ connected by suitable means $ab^2$ to a movable contact $ab^4$ are provided to short circuit more or less of the resistor $ab'$. Preferably, also, the rate and/or extent of movement of motor R may be individually adjusted by means of a speed control adjusting resistor 21A more or less of which is connected in series with motor 21 depending upon the adjustment of a short circuiting contact 21B. The latter is adjusted by means of knob 21D through suitable means 21C.

The general principles of the present invention may be used, in and in connection, with apparatus differing widely in form and purpose from the apparatus shown in Figs. 1–4. Thus, as shown diagrammatically in Fig. 5, by way of example, the invention may be utilized in regulating the supply of steam to the drying roll of a cotton slasher, primarily in response to variations in the moisture content of the yarn passing over the drying rolls, and secondarily in response to the actual temperature or steam pressure in the drying rolls. As those skilled in the art understand, in the operation of a cotton slasher, it is highly important that the yarn after passing through the sizing bath be dried to the amount required to reduce the moisture content of the yarn to a small predetermined amount.

Figure 5:
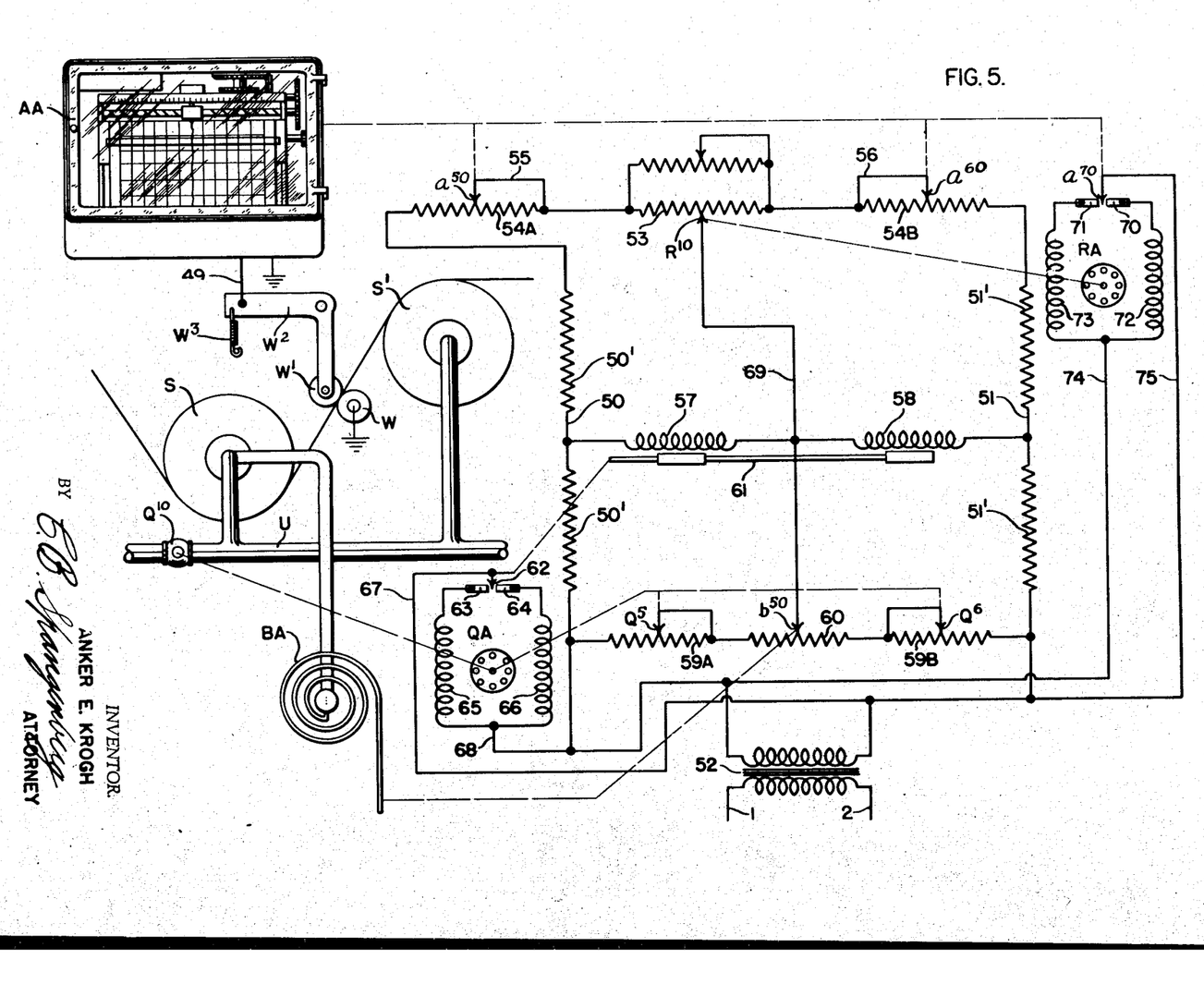
Fig. 5 is a diagrammatic representation of a different embodiment of the invention.

To this end, the slasher ordinarily comprises a plurality of drying rolls over which the yarn passes in series, and into which steam is passed to heat the rolls. In Fig. 5, S may be assumed to be the final drying roll and S' an adjacent drying roll of the slasher. Heating steam is supplied to each of the rolls through a steam supply pipe U and branches connected to the hollow axles of the different rolls, at a rate regulated by the adjustment of a valve $Q^{10}$. For the purposes of the present invention, any one of various known arrangements for measuring the moisture content of the yarn may be employed. On the arrangement shown, the moisture content of the yarn is determined by measuring the electrical resistance of the yarn as it passes between rolls W and W' located between the rolls S and S' journalled in stationary bearings, and the roll W' is supported by a lever $W^2$. The latter is biased by a spring $W^3$ to press the roll W' against the yarn passing between it and the roll W with a suitable pressure. To this end, the roll W is grounded, and the roll W' is electrically connected through its metallic support $W^2$ and a conductor 49, to measuring apparatus comprising a potentiometer control instrument AA, which may be generally similar to the instruments A and B previously described. The electrical measuring circuit through which the instrument A and rolls W and W' are associated need not be described herein as it may take any of various known forms, one of which is disclosed in my prior application Ser. No. 289,404, filed August 10, 1939.

As diagrammatically illustrated in Fig. 5, the contacts $a^{50}$, $a^{60}$ and $a^{70}$ are simultaneously adjusted by the instrument AA, through a connection shown in dotted lines, to the right or left on a decrease or increase, respectively, in the moisture content of the yarn measured by the instrument AA. The contacts $a^{50}$ and $a^{60}$ engage resistors 54A and 54B, respectively, which are connected in series between the energizing conductors 50 and 51 of an electric bridge or control network. As shown, the conductors 50 and 51 are energized by their connection to the secondary terminals of a transformer 52. A resistor 53 is connected in series with and between the resistors 54A and 54B. As shown, the contact $a^{50}$ is connected by a conductor 55 to the right hand end of a resistor 54a, and the contact $a^{60}$ is connected by a conductor 56 to the left end of the resistor 54B. In consequence, the adjustment of the contacts $a^{50}$ and $a^{60}$ by the instrument AA does not change the resistance of the circuit branch including 54A, 53 and 54B.

The bridge includes two other circuit branches connected in parallel between the supply conductors 50 and 51, with resistances 50' and 51' in said conductors between the connections to the different branches. One of those branches is formed by relay coils 57 and 58 which are connected in series with one another. A third circuit branch connecting the energizing conductors 50 and 51, comprises resistors 59A and 59B and a resistor 60 between, and connected in series with the resistors 59A and 59B. A contact $b^{50}$ engaging the resistor 60, is adjusted by a device BA responsive to variations in the steam pressure in the drying roll S. The device BA as diagrammatically shown is a Bourdon tube.

Variations in the relative magnitudes of the current flows through the relay coils 57 and 58, give corresponding movements to the relay armature 61, which then moves a contact 62 into engagement with one or the other of the stationary contacts 63 and 64 at opposite sides of the contact 62, and each out of engagement with the contact 62, in the normal balanced condition of the apparatus. When the contact 62 engages the contact 63, as a result of a decrease in the moisture content of the yarn, it energizes one field winding 65 of the motor QA, which thereupon effects a corrective closing adjustment of the valve $Q^{10}$. When the contact 62 is moved into engagement with the contact 64, it energizes the field winding 66 of the motor QA which is thereupon actuated to effect an opening adjustment of the valve $Q^{10}$. The provisions for energizing the motor QA comprises a conductor 67 connecting the contact 62 to one secondary terminal of the transformer 52, and a conductor 68 connecting the second secondary transformer terminal to the opposite ends of the motor windings 65 and 66 from those to which the contacts 63 and 64 are connected. Through an operating connection, shown in dotted lines in Fig. 5, the motor QA, when in operation, adjusts contacts $Q^5$ and $Q^6$ along the resistors 59A and 59B in the direction to rebalance the bridge. The connected end of the relay coils 57 and 58 are connected by a conductor 69 to the contact $b^{50}$ in engagement with the resistor 60, and to a contact $R^{10}$ in engagement with the resistor 53.

The contact $R^{10}$ is adjusted by a compensating motor RA in one direction or the other, under the control of the instrument AA, accordingly as the moisture content of the yarn is above or below a predetermined normal value. The motor RA is thus made subject to control by the instrument AA through the contact $a^{70}$ and cooperating stationary contacts 70 and 71. The contact 70 is connected to one end of the field winding 72 and the contact 71 is connected to one end of the field winding 73 of the motor RA. The other end of each field winding is connected by a conductor 74 to one secondary terminal of transformer 52, and the other secondary terminal of the transformer is connected by the conductor 75 to the contact $a^{70}$ which is adjusted by the instrument AA. When the moisture content of the yarn is at a normal value or within a certain small normal range of values, the contact $a^{70}$ will be between, and out of engagement with either of the contacts 70 and 71, but on a predetermined decrease or increase of the moisture content from its normal value, the contact $a^{70}$ will be moved into engagement with the contact 70 or 71, respectively, and the motor RA will then adjust the contact $R^{10}$ to the right or left, respectively, and thereby further unbalance the bridge in the direction required to effect a further adjustment of the motor QA and steam valve $Q^{10}$ in the direction to restore the yarn humidity to its normal value.

The proportioning systems shown diagrammatically in Figs. 4 and 5, are desirably alike in that each permits of balancing and rebalancing adjustments in accordance with the movements of compensating and control motors and to changes in each of two different controlling conditions, without effecting such changes in the disposition of the circuit resistance as to make the extent of the response of the control motor to a given extent of change in a controlling condition substantially different in different portions of the control range from what it is in another portion of the control range. The systems shown in Figs. 4 and 5 are more specifically alike also, in that each system includes four circuit adjusting means, two of which respectively adjust the two contacts connected to the adjacent ends of the two relay windings along the respective resistors in the two circuit branches respectively engaged by said contacts, while each of the other two adjusting means operates to transfer resistance in one of said circuit branches from one side to the other of the contact engaged resistor in that branch.

From the standpoint of control sensitivity in different portions of the control range, there is no significant difference between the arrangement shown in Fig. 4, in which resistance is transferred by movements of each of the motor carriages FA and FB from one side to the other of the resistor $ab$ in a single branch of the control system, and the arrangement shown in Fig. 5 in which the instrument AA transfers resistance from one side to the other of the circuit branch including the resistor 53, and the control motor QA transfers resistance from one side to the other of the circuit branch including the resistor 60.

Without suitable preventive provisions such as a control system as those shown in Figs. 4 and 5 may sometimes become objectionably unbalanced as a result of the operation of its reset motor, after the corresponding control motor Q has adjusted the corresponding control valve or other device into either of its two end positions. As a result of such continued operation of the reset motor, when the control system is subsequently restored to the condition in which the corresponding control valve or device should be adjusted back from its end position, the system may be so far out of balance that the condition will overswing to the opposite side of its normal value, before the removal of the excessive reset correction will permit the system to stabilize.

The described overoperation of the reset motor may be prevented by means operating automatically on the adjustment of the corresponding control valve into its end position to prevent further operation of the reset motor in response to the controlling condition departure from normal resulting in the adjustment of the valve or device into its end position. For example, the limit switch mechanism of the control motor Q may be associated with the energizing circuits for the reset motor R, so as to prevent the objectionable excess operation of the latter. Thus as shown in Fig. 6, the limit switch mechanism $Q^{20}$ of the motor Q, which operates limit switches $Q^{21}$ and $Q^{22}$ between the motor windings 14 and 15 respectively, and the switch contacts controlled by the relay armature 10, serve also to open and close a switch $Q^{23}$ when the limit switch $Q^{21}$ is opened and closed, and to open and close a switch $Q^{24}$ when the limit switch $Q^{22}$ is opened and closed. The opening and closing of the switch $Q^{23}$ respectively connects and disconnects the contact $b^{30}$ to the field winding $21L$ of the reset motor RA. Similarly, the opening and closing of the limit switch $Q^{24}$ respectively connects and disconnects the field winding $21H$ of the motor RA to the contact $b^{40}$.

Conveniently in some cases, the relay control switch mechanism including contacts 11, 12 and 13 may be replaced by a mercury switch Y as shown in Fig. 6. Through a suitable connection, the relay armature 10 turns the switch Y clockwise or counterclockwise accordingly as the armature 10 is moved to the right or left. When the switch Y is turned clockwise, the mercury within the contact container connects the right hand pair of terminals extending into the container and thereby connects the field winding 15 of the motor $Q^{22}$ to the supply conductor 2. When the switch Y is turned counterclockwise, the left hand pair of terminals extending into the switch container are connected by the mercury therein and the switch $Q^{21}$ and the conductor 14 are then connected to the supply conductor 1.

As will be apparent, operation of the motor Q into either end position, for example, that in which the limit switch $Q^{21}$ is opened, will, by opening the switch $Q^{23}$, prevent further operation of the reset motor in the direction in which that motor then tends to operate. As soon, however, as a reverse change in the ingot temperature occurs, sufficient to move the contact $b^4$ into engagement with the contact $b^{40}$, the reset motor will begin to operate in the direction tending to check ingot temperature change in the direction which brought the contact $b^4$ into engagement with the contact $b^{40}$.

The same general end attained by the modification of Fig. 6 may also be attained with the modification of Fig. 7 in which a pair of mercury switches ZL and ZH are placed in series with the field windings $21L$ and $21H$ respectively of the reset motor R. Each of the switches ZL and ZH are tilted by the armature 10 when the latter tilts the switch Y. Switches ZL and ZH are both closed in the mid position of switch Y, but switch ZL is opened when switch Y is tilted out of its neutral position in the direction to energize the field winding $21L$ and the switch ZH is opened when the switch Y is tilted out of its neutral position in the direction to energize the field winding $21H$.

In consequence, when the valve Q' is adjusted into either of its end positions and the corresponding adjustment of the contact 6, does not rebalance the bridge, the armature 10 will hold the corresponding switch ZL or ZH in its open position, and thereby prevent operation of the reset motor R in the direction tending to increase the existing circuit unbalance. As soon, however, as the existing departure from normal of the control quantity is reversed, the reset motor will start into operation, even though the switch Y has not been returned to its normal position in the meantime. With the arrangement shown in Fig. 7, the reset motor is normally inoperative during periods in which the control motor is operating. While this results in some interruptions in the operation of the reset motor, when conditions make its operation desirable, such interruptions are of negligible practical importance because the control motor is ordinarily in operation only a small fraction of the time in which the reset motor must be in operation to effect its retarded compensating adjustments.

As those skilled in the art will understand, the present invention is primarily concerned with the problem of how to satisfactorily minimize the hunting tendency inevitable in any control system for a process involving time lag, such as the lag in the temperature response of the ingots to a variation in the fuel supply to the furnace shown in Fig. 1, or in the temperature response of the slasher drums shown in Fig. 5, to a variation in the pressure of the heating steam supplied to those drums. The use of the invention in the control of a slasher is especially advantageous because it is adapted to care for the special problem resulting from the fact that in ordinary practice, the permissible drying drum temperature variation is usually quite small, being usually from about 235° F. to about 250° F.

This application is a continuation in part of each of my prior applications, Ser. No. 201,069, filed April 9, 1938, and issued into Patent 2,285,287 on June 2, 1942, and Ser. No. 202,307, filed April 15, 1938 and issued into Patent 2,285,288 on June 2, 1942.

While in accordance with the provisions of the statutes, I have illustrated and described the best forms of my invention now known to me, it will be apparent to those skilled in the art, that changes may be made in the form of the apparatus and modes of operation specifically illustrated and described herein, without departing from the spirit of my invention as set forth in the appended claims, and will also understand that certain features of my invention may sometimes be used to advantage without a corresponding use of other features.

Having now described my invention, what I claim as new and desire to secure by Letters Patent, is:

1. In an electric proportioning system, the combination of a bridge circuit comprising a pair of relay windings connected in series to a source of potential difference and two circuit branches each including a resistor and connected to said source in parallel with the other branch and with said relay windings, a separate contact means engaging and adjustable along the length of each resistor, means for transferring resistance in one of said branches from one side to the other of the resistor therein, a second means for transferring resistance in one of said branches from one side to the other of the resistor therein, a conductor connection between the adjacent ends of said relay windings and each of said contact means, a reversible compensating motor energized by and in accordance with the direction of departure of at least one of a plurality of controlling conditions from its normal value and adjusting one of said means when energized, a reversible control motor energized by and in accordance with differences in the currents flowing in the two relay windings for effecting a control action and adjusting a second of said means when energized, mechanism actuated by changes in one of said controlling conditions to adjust a third one of said means, and mechanism actuated by changes in a second one of said controlling conditions to adjust a fourth one of said means.

2. In an electric proportioning system, the combination of a bridge circuit comprising a pair of relay windings connected in series to a source of potential difference and two circuit branches each including a resistor and connected to said source in parallel with the other branch and with said relay windings, mechanism responsive to one control condition for transferring resistance in one of said branches from one side to the other of the resistor therein, mechanism responsive to a second control condition for transferring resistance in said one of said branches from one side to the other of the resistor therein, a separate contact engaging and adjustable along each of said resistors, a conductor connection between the adjacent ends of said relay windings and each of said contacts, a reversible compensating motor actuated on and in accordance with the direction of departure of at least one of said controlling conditions from a normal value thereof to effect a corresponding adjustment of one of said contacts, and a control motor actuated on and in accordance with the difference between the currents flowing through the two relay windings for effecting a control action, and a corresponding adjustment of the other contact.

3. In an electric proportioning system, the combination of a bridge circuit comprising a pair of relay windings connected in series to a source of potential difference and two circuit branches each including a resistor and connected to said source in parallel with the other branch and with said relay windings, a separate contact engaging and adjustable long the length of each of said resistors, mechanism responsive to a change in one controlling condition for transferring resistance in one of said circuit branches from one side to the other of the resistor therein, a compensating motor actuated by and in accordance with the departure of a controlling quantity from a normal value thereof to adjust the contact engaging the last mentioned resistor along the latter, mechanism responsive to a change in a second controlling condition for adjusting the other of said contacts along the resistor with which it is in engagement, a reversible control motor energized by and in accordance with the differences in the currents flowing in the two relay windings for effecting a control action and for transferring resistance in the branch including the last mentioned resistor from one side to the other thereof.

4. Automatic control apparatus including an electrical bridge circuit, bridge energizing means, first and second devices adapted to adjust the impedance of one side of the bridge, third and fourth devices adapted to adjust the impedance of the opposite side of the bridge, means responsive to a first variable condition and connected to adjust said first and third devices in accordance with variations in said condition and thereby proportionately unbalance said bridge while maintaining the total bridge impedance substantially constant, means responsive to a second variable condition related to the first mentioned variable condition, and connected to adjust said second and fourth devices in accordance with variations in said condition and thereby proportionately unbalance said bridge while maintaining the total bridge impedance substantially constant, a relay connected to said bridge and adapted to respond to bridge unbalance, motor means controlled by said relay and adapted to rebalance said bridge, means adjusted by said motor and adapted to control both of said conditions, and additional compensating means responsive to one of said conditions and adapted to unbalance said bridge in accordance with the difference between the value of said condition and a predetermined value thereof.

5. Automatic control apparatus including an electrical bridge circuit, bridge energizing means, first and second devices adapted to adjust the impedance of one side of the bridge, third and fourth devices adapted to adjust the impedance of the opposite side of the bridge, means responsive to a first variable condition and connected to adjust said first and third devices in accordance with variations in said condition and thereby proportionately unbalance said bridge while maintaining the total bridge impedance substantially constant, means responsive to a second variable condition related to the first mentioned variable condition, and connected to adjust said second and fourth devices in accordance with variations in said condition and thereby proportionately unbalance said bridge while maintaining the total bridge impedance substantially constant, a relay connected to said bridge and adapted to respond to bridge unbalance, motor means controlled by said relay and adapted to rebalance said bridge, means adjusted by said motor and adapted to control both of said conditions, additional means responsive to one of said conditions and adapted to unbalance said bridge in accordance with the difference between the value of said condition and a predetermined value thereof, and further additional means responsive to the other of said conditions and adapted to unbalance said bridge in accordance with the difference between the value of said other condition and a predetermined value thereof.

6. The combination of claim 5 in which said additional means and said further additional means each comprises electrical contacts respectively controlled by said conditions and adapted to energize a reversible electrical motor, the contacts adapted to energize said motor in one direction connected in series, and the contacts adapted to energize said motor in the other direction connected in parallel.

7. In a control system, a device responsive to variations in the value of a measurable condition, a second device responsive to variations in a second measurable condition, means jointly controlled by said devices to control said conditions, and a third device responsive to the difference between the actual value of either of said conditions and a predetermined value thereof, and adapted to further control said conditions in accordance with said difference, and means to eliminate the last mentioned control effect if either of said conditions exceeds a predetermined value.

8. The combination of claim 7 in which said third device includes electrical contacts selectively energized in accordance with variations in one condition, and a reversible electrical motor for controlling said condition and energized through said contacts, and in which the eliminating means includes contacts selectively energized in accordance with variations in the second condition to selectively interrupt or complete the energizing circuits closed by the first mentioned contacts.

9. In a control system, the combination of means responsive to a variable control quantity, control mechanism adjusted by said means on a change in said quantity in a direction selectively dependent on the direction of said change, a reversible electric motor normally actuated by said means on a departure of said quantity from a predetermined normal value thereof to effect a compensating adjustment in a direction dependent upon the direction of departure, a second reversible electrical motor normally actuated by said means to effect a control action on each change in said quantity in a direction dependent on the direction of said change, a limit switch mechanism for interrupting the operation of said second motor on the creation of a control effect of given magnitude in either direction, and means through which said limit switch mechanism when actuated to interrupt the operation of said second motor prevents further operation of the first mentioned motor in the direction corresponding to the direction of the previous departure from normal of said quantity, without preventing the operation of the first mentioned motor in immediate response to a subsequent departure of said quantity in the opposite direction from normal.

10. In a control system, the combination of a regulator, a reversible electric motor adapted when energized to adjust said regulator, control means for said motor comprising an electric bridge circuit, first and second adjustable elements, each adapted to unbalance said bridge circuit on its adjustment, a third adjustable element adapted by its adjustment to neutralize the unbalancing effects of the first and second element adjustments, means responsive to a variable control condition for effecting adjustments of said first adjustable element, reset means normally operative to effect delayed adjustments of said second element on and in accordance with the departure of a control quantity from a normal value thereof, means through which the operation of said motor effects a corresponding adjustment of said third element, means actuated by unbalance in said circuit to prevent operation of said reset means and to subject said motor to a control action tending to energize the latter for rebalancing operations, and means actuated by an adjustment of said regulator of predetermined extent in one direction, to prevent energization of said motor for operation to effect further adjustment of said regulator in said direction.

11. In an electric proportioning system, the combination of a bridge circuit comprising a pair of relay windings connected in series to a source of potential difference and two circuit branches each including a resistor and connected to said source in parallel with the other branch and with said relay windings, a separate contact means engaging and adjustable along the length of each resistor, means for transferring resistance in one of said branches from one side to the other of the resistor therein while maintaining the total resistance of the circuit branch including said resistor constant, a second means for transferring resistance in one of said branches from one side to the other of the resistor therein, a conductor connection between the adjacent ends of said relay windings and each of said contact means, a reversible electrical compensating motor energized by and in accordance with the direction of departure of at least one of a plurality of controlling conditions from its normal value and adjusting one of said means when energized, a reversible electrical control motor energized by and in accordance with differences in the currents flowing in the two relay windings for effecting a control action and adjusting a second of said means when energized, mechanism actuated by changes in said one of said controlling conditions to adjust a third one of said means, and mechanism actuated by changes in a second one of said controlling conditions to adjust a fourth one of said means.

12. In an electric proportioning system, the combination of a bridge circuit comprising a pair of relay windings connected in series to a source of potential difference and two circuit branches each including a resistor and connected to said source in parallel with the other branch and with said relay windings, a separate contact means engaging and adjustable along the length of each resistor, means for transferring resistance in one of said branches from one side to the other of the resistor therein while maintaining the total resistance of the circuit branch including said resistor constant, a second means for transferring resistance in one of said branches from one side to the other of the resistor therein, a conductor connection between the adjacent ends of said relay windings and each of said contact means, a reversible electrical compensating motor energized by and in accordance with the direction of departure of at least one of a plurality of controlling conditions from its normal value and adjusting one of said means when energized, a reversible electrical control motor energized by and in accordance with differences in the currents flowing in the two relay windings for effecting a control action and adjusting a second of said means when energized, mechanism actuated by changes in said one of said controlling conditions to adjust a third one of said means, mechanism actuated by changes in a second one of said controlling conditions to adjust a fourth one of said means, a limit switch mechanism for interrupting the operation of said control motor on the creation of a control effect of given magnitude in either direction, and means through which said limit switch mechanism when actuated to interrupt the operation of said control motor also renders said compensating motor inoperative to effect further adjustment of said one means in the direction corresponding to the direction of the previous departure from normal of said one controlling condition.

13. In an electric proportioning system, the combination of a bridge circuit comprising a pair of relay windings connected in series to a source of potential difference and two circuit branches each including a resistor and connected to said source in parallel with the other branch and with said relay windings, a separate contact means engaging and adjustable along the length of each resistor, means for transferring resistance in one of said branches from one side to the other of the resistor therein, a second means for transferring resistance in one of said branches from one side to the other of the resistor therein, a conductor connection between the adjacent ends of said relay windings and each of said contact means, a reversible compensating motor energized by and in accordance with the direction of departure of at least one of a plurality of controlling conditions from its normal value and adjusting one of said means when energized, a reversible control motor energized by and in accordance with differences in currents flowing in the two relay windings for effecting a control action and adjusting a second of said means when energized, mechanism actuated by changes in said one of said controlling conditions to adjust a third one of said means, mechanism actuated by changes in a second one of said controlling conditions to adjust a fourth one of said means, a limit switch mechanism for interrupting the operation of said control motor on the creation of a control effect of given magnitude in either direction and means through which said limit switch mechanism when actuated to interrupt the operation of said control motor also renders said compensating motor inoperative to effect further adjustment of said one means in the direction corresponding to the direction of the previous departure from normal of said one controlling condition.

14. In a control system, a device responsive to variations in the value of a measurable condition, a second device responsive to variations in a second measurable condition, means jointly controlled by said devices to control said conditions, and a third device responsive to the difference between the actual value of either of said conditions and a predetermined value thereof and adapted to further control said conditions in accordance with said difference.

ANKER E. KROGH.